US 9,043,555 B1

(12) United States Patent
Khona et al.

(10) Patent No.: US 9,043,555 B1
(45) Date of Patent: May 26, 2015

(54) SINGLE INSTANCE BUFFER CACHE METHOD AND SYSTEM

(75) Inventors: Rahul Khona, San Jose, CA (US);
Subramaniam Periyagaram, San Jose, CA (US); Sandeep Yadav, Santa Clara, CA (US); Dnyaneshwar Pawar, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 1094 days.

(21) Appl. No.: 12/392,994

(22) Filed: Feb. 25, 2009

(51) Int. Cl.
*G06F 12/00* (2006.01)
*G06F 3/06* (2006.01)

(52) U.S. Cl.
CPC ............ *G06F 3/0641* (2013.01); *G06F 3/0608* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 6,457,097 B1 * | 9/2002 | Tamura | 711/113 |
| 2004/0220961 A1 * | 11/2004 | Lee et al. | 707/102 |
| 2005/0144223 A1 * | 6/2005 | Yang et al. | 709/203 |
| 2009/0228484 A1 * | 9/2009 | Reddy et al. | 707/6 |
| 2009/0254507 A1 * | 10/2009 | Hosoya et al. | 706/48 |
| 2011/0107052 A1 * | 5/2011 | Narayanasamy | 711/171 |

* cited by examiner

*Primary Examiner* — Matthew Bradley
*Assistant Examiner* — Alan Otto
(74) *Attorney, Agent, or Firm* — LeClairRyan, a Professional Corporation

(57) ABSTRACT

Provided is a method and system for reducing duplicate buffers in buffer cache associated with a storage device. Reducing buffer duplication in a buffer cache includes accessing a file reference pointer associated with a file in a deduplicated filesystem when attempting to load a requested data block from the file into the buffer cache. To determine if the requested data block is already in the buffer cache, aspects of the invention compare a fingerprint that identifies the requested data block against one or more fingerprints identifying a corresponding one or more sharable data blocks in the buffer cache. A match between the fingerprint of the requested data block and the fingerprint from a sharable data block in the buffer cache indicates that the requested data block is already loaded in buffer cache. The sharable data block in buffer cache is used instead thereby reducing buffer duplication in the buffer cache.

36 Claims, 6 Drawing Sheets

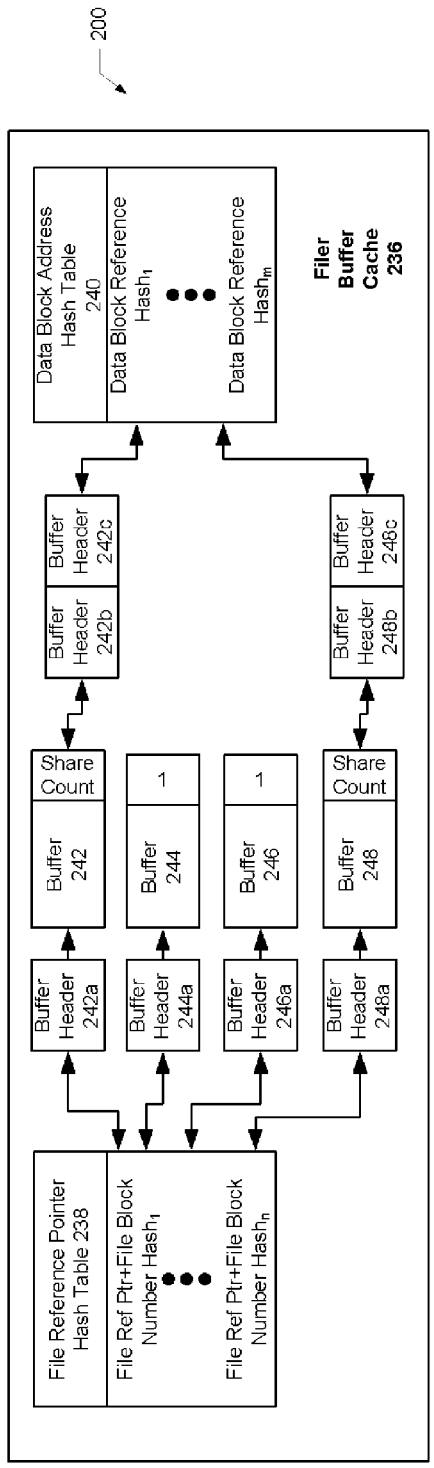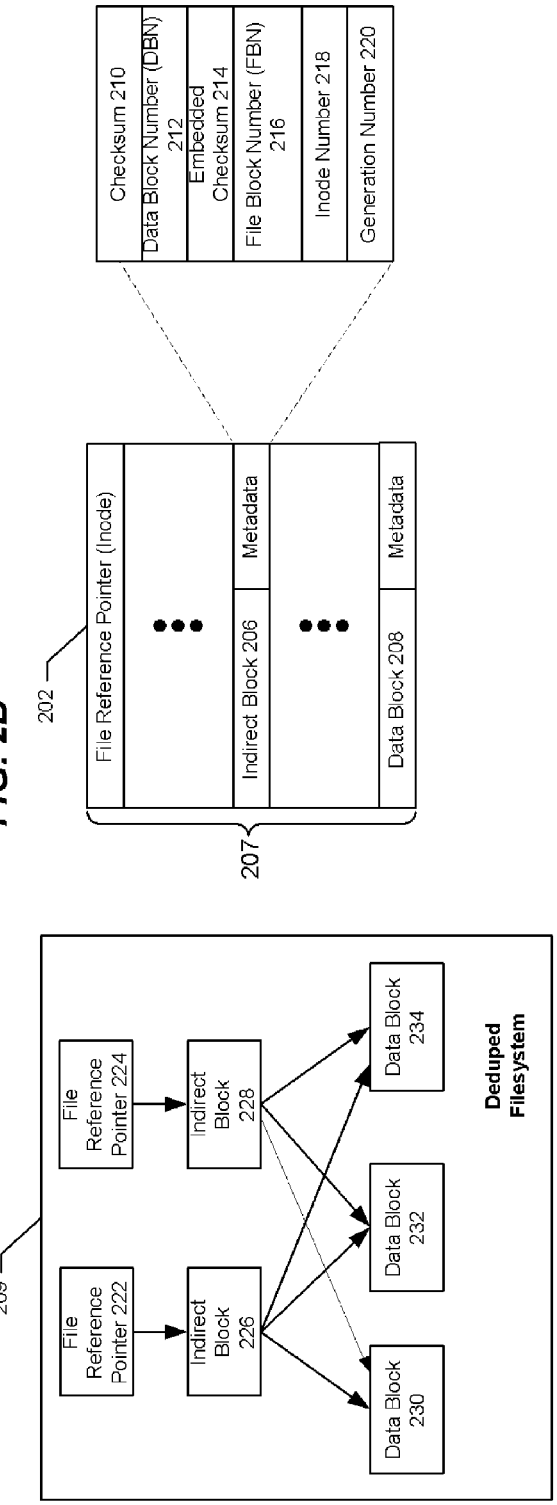
FIG. 2B
FIG. 2A

SINGLE INSTANCE BUFFER CACHE METHOD AND SYSTEM

INTRODUCTION

Data deduplication and single instance storage (SIS) technology have been implemented on storage servers to consolidate storage and reduce costs. The deduplication process on a storage device searches through storage looking for identical copies of data. When the same data is found, the deduping process eliminates all but one copy of the data and returns the recovered storage to the filesystem for reallocation.

The deduplication may be done on files or underlying data blocks. File deduplication attempts to find entire files that are identical within a system and then eliminate the unneeded copies. For example, enterprises using the Windows® Operating System (Windows is a registered trademark of Microsoft Corporation in the United States and other countries) may have numerous identical copies of Windows executables on shared storage. Eliminating duplicate copies of these files immediately saves valuable storage space. Block-level deduplication operates on individual blocks that may be duplicated in one or several files. Duplicated blocks eliminated through the deduping process also results in increased storage space on a block-by-block basis.

Storage deduplication helps storage management tasks by reducing the amount of storage to buy and manage. That reduces not only hardware and software costs, but also data center real estate, power and cooling costs as well. Presently, there is no practical method to reduce data deduplication in buffer cache. Each process or thread requires a separate copy of an application to be loaded in buffer cache during execution. The buffer cache is used to execute applications as it has much faster access time. However, it is not feasible to continually increase the size of buffer cache due to increased costs and practical physical limitations of the storage systems.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein:

FIG. 2A is a schematic block diagram overview of the structures in a filesystem and the organization of deduplicated blocks on a storage device in accordance with aspects of the present invention;

FIG. 2B provides a schematic block diagram of the structures to implement a single instance buffer cache in accordance with aspects of the present invention;

SUMMARY OF THE INVENTION

Provided is a method and system for reducing duplicate buffers in buffer cache associated with a storage device. Reducing buffer duplication in a buffer cache includes accessing a file reference pointer associated with a file in a deduplicated filesystem when attempting to load a requested data block from the file into the buffer cache. To determine if the requested data block is already in the buffer cache, aspects of the invention compare a fingerprint that identifies the requested data block against one or more fingerprints identifying a corresponding one or more sharable data blocks in the buffer cache. A match between the fingerprint of the requested data block and the fingerprint from a sharable data block in the buffer cache indicates that the requested data block is already loaded in buffer cache. The sharable data block in buffer cache is used instead thereby reducing buffer duplication in the buffer cache.

DETAILED DESCRIPTION

Aspects of the present invention provide a method and system for reducing the presence of duplicate buffers in buffer cache. Benefits provided by aspects of the present invention include, but are not limited to, one or more of the following mentioned herein below. The buffer cache available in a storage server or other computer device is typically limited by the availability or cost of overall memory, cache or other storage. To best utilize this limited resource, aspects of the present invention allow data blocks in buffer cache to be shared by more than one process. Each process that shares a block rather than keeping a separate copy in buffer cache reduces the demand for larger buffer cache. This increases the effective size of the buffer cache as more data can be handled using the same memory footprint.

Implementations of the present invention facilitate a single-instance buffer cache without a significant increase in processing. A portion of the deduplication information generated in association with a storage system is reused in accordance with aspects of the present invention. Reusing and exploiting information in a deduplicated filesystem makes implementing single-instance buffer cache in accordance with the present invention even more compelling.

Aspects of the present invention use a "copy-on-write" technique on the sharable data blocks in buffer cache. Processes create their own copy of a shareable data block on demand and before they modify a shared data block. This enables individual processes to share data blocks in buffer cache as well as have the option to write or modify the block as needed. This further feature of single-instance buffer cache allows rapid implementation and integration of the present invention with other systems.

Figure 1:
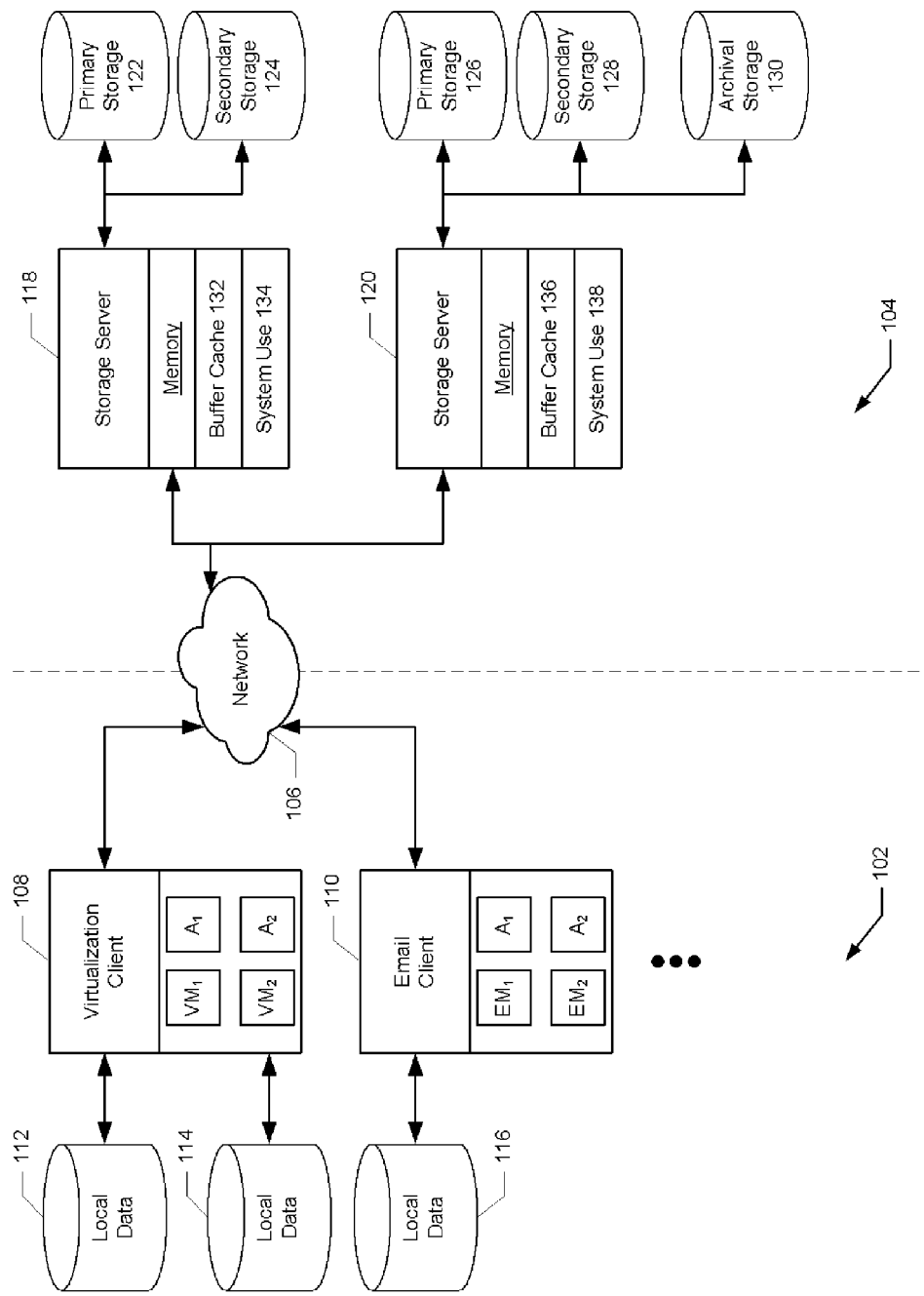
FIG. 1 is a schematic block diagram of an exemplary system providing a single-instance buffer cache in accordance with aspects of the present invention.

FIG. 1 is a schematic block diagram of an exemplary system 100 providing single-instance buffer cache in accordance with aspects of the present invention. Client-side 102 of system 100 in FIG. 1 has a virtualization client 108, an email client 104 and may include many other clients as well. These clients communicate across network 106 to server-side 104. Storage server 118 and storage server 120 may implement a storage operating system and single-instance buffer cache management in accordance with the present invention.

In one implementation, storage devices making up primary storage 122, secondary storage 124, primary storage 126, secondary storage 128 or archival storage 130 may be implemented using physical storage disks having one or more storage volumes to define an overall logical arrangement of storage space. Some storage server implementations can serve a much larger number of storage volumes as dictated by the particular implementation.

A storage volume is "loaded" in storage server 118 or 120 by copying the logical organization of the volume's files, data and directories into memory of storage server 118 or 120. Once a volume has been loaded in memory of a storage server, the volume may be "mounted" by one or more users, applications, or devices as long as they are permitted to access its contents and navigate its namespace. As used herein, a volume is said to be "in use" when it is loaded in a server's memory and at least one user, application, or device has mounted the volume and accessed its contents.

As illustrated in FIG. 1, storage servers like storage server 118 may be configured to operate according to a client/server model of information delivery thereby allowing multiple clients, such as virtualization client 108 and email client 110, to access files simultaneously. In this model, virtualization client 108 may be a computer running an application, such as a file-system protocol, that connects to storage server 118 over a network 106 with point-to-point links, shared LAN, WAN, or VPN as implemented over a public network such as the Internet. Communications between storage server 118 and virtualization client 108 is typically embodied as packets sent over the computer network. Each client may request the services of storage server 118 by issuing file-system protocol messages formatted in accordance with a conventional file-system protocol, such as the Common Internet File System (CIFS) or Network File System (NFS) protocol.

In one implementation, exemplary system 100 may provide storage services to clients using file-level servers such as used in a network-attached storage (NAS) environment, block-level storage servers such as used in a storage area network (SAN) environment, or other storage systems which are capable of providing both file-level and block-level service. Each of these technologies may be processed using deduplication both in storage and in buffer cache in accordance with aspects of the present invention. Further, although the storage systems 118 and 120 are illustrated as single units in FIG. 1, they can also be implemented in a distributed architecture. For example, each storage server in system 100 can be implemented with multiple distributed storage servers. It can also include a physically separate network module (e.g., "N-module") and disk module (e.g., "D-module") (not shown), which communicate with other storage servers over an external interconnect.

The N-module acts as a front-end of the storage server, exporting services to clients; and the D-module acts as the back-end, managing and implementing a parity declustered distribution of a RAID organization on the underlying storage of the storage server. The N-module and D-module can be contained in separate housings and communicate with each other via network connections. Thus, the N-module and the Dmodule enable a storage server to be physically separated into multiple modules that can be distributed across a network. In one embodiment, storage system 120 can include multiple N-modules and D-modules, each of the N-modules corresponding to one or more D-modules, and each of the D-modules corresponding to one or more N-modules.

To improve storage efficiency, primary storage 122 and primary storage 126 implement block-level data deduplication to avoid keeping multiple copies of blocks on disk. Files stored on disk with deduplication may share all the same data blocks of identical files or may only share a few blocks if the files are mostly different. For example, a power-point-presentation created by one user and modified by a second user may share a majority of the same physical data blocks stored on primary storage 122 but for the modifications made by the second user of the power-point-presentation. Indeed, deduplication may be most applicable to the delivery of primary storage 122 and primary storage 126 however it is contemplated that aspects of the present invention could also be used in conjunction with secondary storage 124 and 128 or archival storage 130.

Aspects of the present invention compliment the deduplicated data on primary storage 122 and 126 with single-instance buffer cache management. Benefits from sharing one or more data blocks on disk are complimented by the sharing of data blocks in buffer cache. Unlike conventional buffer cache, the single-instance buffer cache of the present invention does not take a deduped copy of a file from storage and load it multiple times in buffer cache.

Single-instance buffer cache of the present invention is particularly useful with virtualization client 108 as the operating system binary files, patches and drivers tend to exhibit a high degree of data duplication at the data block and even at the file level. Virtual machines from VMWare® and other vendors yield some of the greatest performance and scalability benefits as only a single copy of the executable is kept in buffer cache. (VMWare is a registered trademark of VMWare Incorporated in the United States and other countries) For example, a single instance of the data blocks for a Windows Operating System in buffer cache can easily service one or a hundred virtual machine in accordance with the present invention without requiring more buffer cache. This helps buffer cache performance keep up with other areas of the storage server performance as enterprises continue to embrace and grow virtualization client 108 in their businesses.

To some degree, other applications such as email client 110 may also take advantage of single-instance buffer cache management of the present invention. Applications designed to share certain libraries or other common files during execution will also have shared data blocks loaded in buffer cache 132 or buffer cache 136 in accordance with the present invention. Buffer cache in the illustrated example in FIG. 1 uses memory on a storage system however it is contemplated that buffer cache may be implemented using other types of storage found on a computer system including level 1 (L1) cache, level 2 (L2), level 3 (L3) cache as well as disk storage or virtual storage using a combination of memory and disk storage.

For example, a large manual or set of images mailed out to employees in an enterprise would get deduplicated on primary storage 122 and primary storage 126 and then placed in buffer cache 132 and buffer cache 136 as a single-instance when the documents are referenced and read. It is also contemplated that many other applications, other than email client 110 and virtualization client 108, may also benefit from aspects of the present invention as long as there are some shared data blocks present in buffer cache.

FIG. 2A is a schematic block diagram overview of the structures in a filesystem and the organization of deduplicated blocks on a storage device. A user file buffer tree 207 (also referred to as a "user buffer tree") lays out the underlying organization of a file, metadata and the physical location of underlying data blocks. Normally, the user buffer tree 207 can be used to locate data blocks in a file responsive to client-initiated read or write requests. In this example, user buffer tree 207 in FIG. 2A includes file reference pointer 202 (inode) one or more indirect blocks 206 and one or more data blocks

208. Each indirect block 206 and data block 208 has appended to it metadata describing the respective block.

File reference pointer 202 (also referred to as an "inode") is an elementary data structure used in almost all filesystems to organize data blocks and related metadata. It should be understood that file reference pointer 202 and user buffer tree 207 represents only one organizational scheme and that many other variations for organizing larger amounts of data and storage are contemplated.

In this example, file reference pointer 202 is allocated for each file by the filesystem and generally represents a unique value within a certain volume or other storage construct. The position of the logical file blocks within a file may be expressed as a relative offset to the file reference pointer 202. The relative offset calculation for file blocks in a file is useful to quickly find data especially since it is not necessary to know the actual physical data block address or precisely where a data block is located. For example, a specific file block in a file can be quickly calculated using a combination of a file reference pointer 202 and the offset of the file block of interest as a multiple of file block size and its relative position in the file. In one implementation developed by NetApp®, Inc. of Sunnyvalue, Calif., file block numbers (FBN) in the WAFL® filesystems fall on an ascending sequence of 4K increments at an offset to the file reference pointer. (NetApp and WAFL are registered trademarks of NetApp Incorporated in the United States and other countries)

Referring to FIG. 2A, the metadata as illustrated includes a checksum 210 for the block, a disk block number (DBN) 212 for the particular block and an embedded checksum 214 for the metadata field itself. In a conventional file system the DBN 212 may represent a physical data block address identifying a physical location where the block is located on disk.

In the FlexVol™ flexible volume technology developed by NetApp, Inc. every block is associated with at least both a logical location and a physical location. The logical location of a block is the virtual volume block number (VVBN) and the physical location is the physical volume block number (PVBN). Accordingly, the physical data block number or DBN 212 associated with conventional file systems correlates to the VVBN in the FlexVol technology. Both the VVBN and PVBN are kept in the inodes and indirect blocks 206 of the FlexVol and available for use by the WAFL filesystem. This reduces the overhead associated with traversing both a user buffer tree and a container buffer tree (not illustrated) to translate between FBN and PVBN values. As described in further later herein, the single-instance buffer cache of the present invention may be implemented using a VVBN or PVBN in the FlexVol technology developed by NetApp, Inc. as well as the physical data block address of a conventional file system.

Metadata in user buffer tree 207 further includes context information for the block generated by the file system including the file block number (FBN) 216, inode number 218 and generation number 220. Inode number 218 identifies the inode of the file containing the block itself while generation number 220 indicates a number of times the block has been written in place. FBN 216 represents an offset into the file where the block is located except in the case of FlexVol in which case the VVBN represents an offset into a container of the flexible volume.

Deduped filesystem 209 in FIG. 2A illustrates the relationship between shared data blocks and files on a storage server. It can be seen in this example that data block 230, data block 232 and data block 234 are shared between two files identified through file reference pointer 222 and file reference pointer 224. The respective indirect blocks 226 and 228 both refer to the physical data block addresses of all three data blocks and do not use an exclusive copy. This results in a 50% savings on storage in the respective storage system as the shared data blocks eliminate duplicate storage.

FIG. 2B provides a schematic block diagram of the structures for implementing a single-instance buffer cache in accordance with the present invention. Aspects of the present invention take advantage of the fact that a requested data block may have been recently used and therefore already loaded in buffer cache. In accordance with one implementation, the buffer cache manager performs two different comparisons to detect if a buffer in buffer cache already has the requested data block and it can be shared.

The first comparison checks if the requested data block and associated file were recently loaded into buffer cache. To determine this, one approach uses a file reference pointer (inode) and offset as indicated in a file block number (FBN) for the requested data block. This combination for the requested data block is compared against the file reference pointer and offset associated with each data block already in buffer cache. To expedite this process, it is useful to create a file reference pointer hash table 238 with a hash of the file reference pointer and FBN for each data block already loaded in buffer cache. If the hash of file reference pointer and FBN for the requested data block does not match a hash table entry then the file and data block were not recently cached. Conversely, matching a hash entry in file reference pointer table 238 indicates a recently cached copy of the requested block is in one of buffer 242, buffer 244, buffer 246 or buffer 248. Additional details and metadata on the cached buffers may be included in buffer headers 242a, 244a, 246a, 248a respectively.

The second comparison checks to see if the requested data block is in buffer cache but in association with a different file reference pointer or file. This might occur in a deduplicated file system where a single data block is shared with several or many different files and their respective file reference pointers or inodes. For example, a deduplicated file system used by numerous virtualization clients may dedupe the blocks associated with multiple copies of the Windows® Operating on the storage server. Each virtualization client may use the same copy of the Windows Operating System thus sharing the associated data blocks in buffer cache and obviating the need to load multiple copies of Windows.

In one implementation, the second comparison checks an actual 'fingerprint' of the data block to determine if the requested block is in fact already loaded in buffer cache. This fingerprint may be a hash of the physical data block address of the data block number (DBN) or, in the case of the FlexVol technology, a hash of the VVBN associated with the data block. FlexVol may also perform a hash of the physical volume block number (PVBN).

In accordance with one implementation, the physical address of the requested data block is obtained and then hashed. The resulting hash of the requested data block is compared against a data block address hash table 240 having similar entries for each data block address in buffer cache. A match indicates that the requested data block is already in buffer cache and the corresponding buffer should be shared. In this example, the requested data block address hash matched buffer 242 by way an entry in data block address hash table 240. Buffer header 242b and buffer header 242c were generated so they could each share data block loaded in buffer 242. Likewise, buffer header 248b and buffer header 248c were also created when the requested data block hash matched another entry in the data block address hash table

240. A share count associated with each buffer 242 and buffer 248 keeps track of the number of references being made to the buffers in buffer cache. In an alternate implementation, it is contemplated that the 'fingerprint' for a data block may be derived using an MD5 hash of the data block contents or a checksum of the entire content block.

Figure 3:
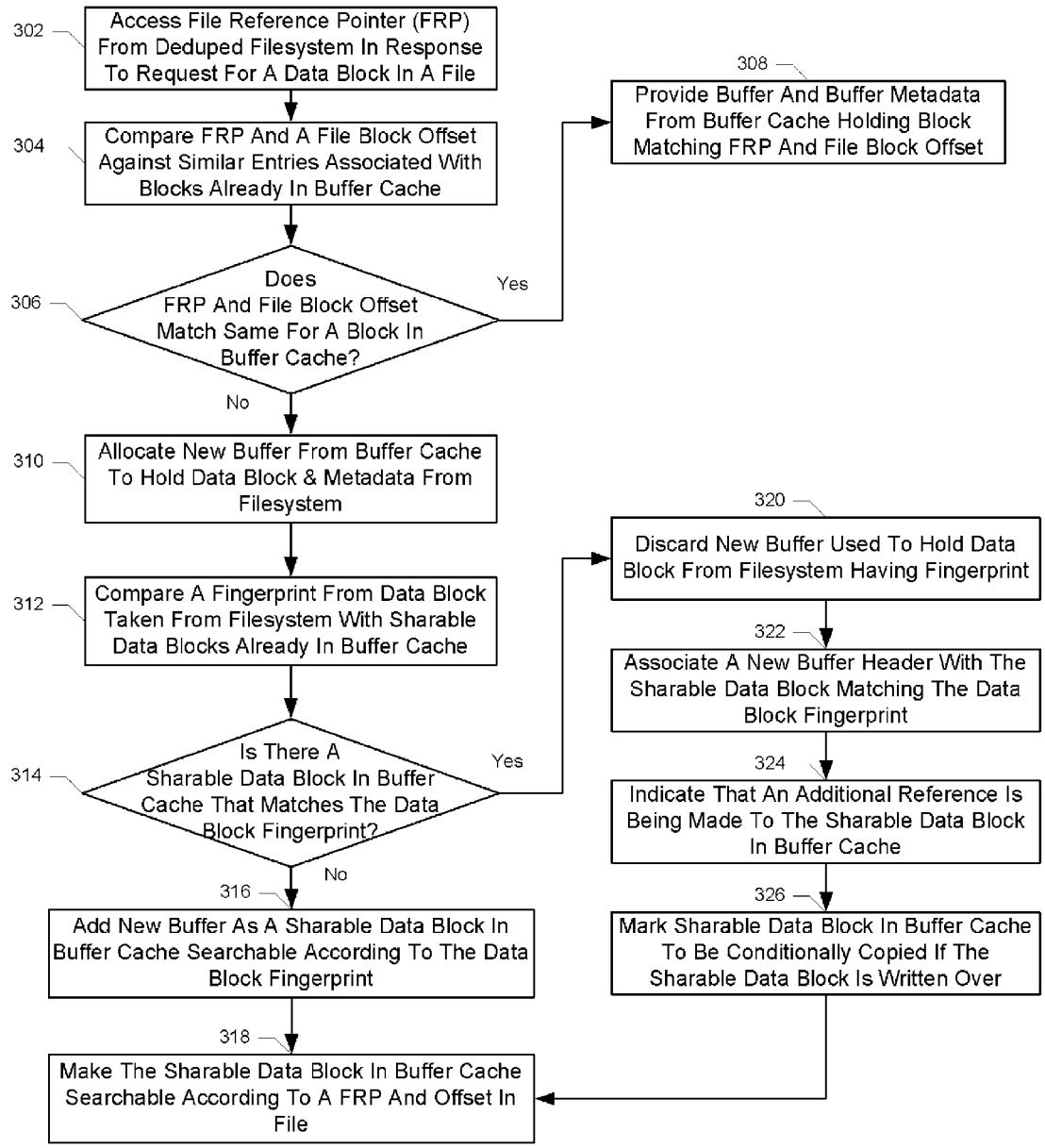
FIG. 3 is a flowchart diagram representation of the operations associated with reducing buffer duplication in buffer cache in accordance with aspects of the present invention.

FIG. 3 is a flowchart diagram representation of the operations associated with reducing buffer duplication in buffer cache in accordance with aspects of the present invention. Typically, these associated operations are invoked when there is a request for a data block in a file and a storage server wants to cache the data block in buffer cache. Initially, the file reference pointer of the file holding the requested data block is obtained from the filesystem. (302) Aspects of the present invention compare whether an offset from the file reference pointer of the requested file matches an offset and file reference pointer associated with a data block already in buffer cache. (304) For example, the present invention may check to see if a third file block offset at 12K from the file reference pointer matches the blocks at the same offset from a file reference pointer already stored in buffer cache. In one implementation, file block numbers (FBN) in the WAFL file system specify file locations measured in 4K increments from the file reference pointer or inode. Consequently, a FBN of 3 may be at offset 12K in a file within the WAFL file system. It is contemplated that implementations of the present invention may be used in conjunction with offsets measured in a variety of different increments and should not be limited to file block numbers, 4K boundaries or any other predetermined measurement.

A match indicates that the file reference pointer and block offset was previously placed in buffer cache. If there is a match (306-Yes), then aspects of the present invention provide the buffer and buffer metadata from buffer cache holding the block matching the offset from the file reference pointer. (308) As previously described, one implementation may compare the hash of the file reference pointer and FBN of the requested block against entries in a hash table containing a hash of similar values for every data block already loaded in buffer cache.

However, a failed match does not necessarily mean the requested data block is not already in buffer cache. (306-No) In a deduplicated file system, it is possible that the requested data block has been deduplicated on a storage device and is now a sharable data block in the buffer cache. Aspects of the present invention recognize that sharable data blocks loaded on disk storage may also be sharable data blocks when loaded into buffer cache.

Accordingly, one implementation of the present invention first allocates a new buffer from buffer cache to hold the data block and metadata from the filesystem. (310) This one implementation uses this new buffer to temporarily hold the requested data block while searching for a matching data block already loaded into buffer cache. Alternate implementations of the present invention do not yet allocate a new buffer from buffer cache but used a predetermined temporary buffer from buffer cache set aside to temporarily hold the metadata and data block as necessary. This alternate implementation obviates the need to later discard a newly allocated buffer when the data block is already in buffer cache.

Next, the present invention compares a "fingerprint" from the requested data block against fingerprints associated with sharable data blocks already in buffer cache. (312) As previously described, the 'fingerprint' may be the result a variety of different processes operating upon the requested data block to identify it with sufficient particularity. For example, hashing the physical data block address associated with the data block may generate one type of fingerprint for the data block file. Hashing the physical address of a data block is generally sufficient to reliably identify the data block and create a fingerprint. Alternate 'fingerprints' of the data block may also include performing checksums on the contents of the data block or hashes on various combinations of checksums, physical data block addresses or other identifiers associated with the physical data block.

In the case of FlexVol by NetApp, Inc. or other flexible volume managers, a virtual volume block number (VVBN) may be used in lieu of the physical data block address. The VVBN identifies the block within the container file of the volume manager framework. It is also contemplated that physical volume block number or PVBN can also be used to identify the requested data block with an aggregate of the volume manager when implementing aspects of the present invention with FlexVol or other flexible storage volume. In this latter case, it may be necessary to combine the PVBN along with a volume identifier if there are multiple volumes in the flexible storage volume having the same PVBN and hash collisions are to be avoided.

Generally, the comparison further may include creating a hash table of the physical data block addresses of each of the one or more sharable data blocks already in buffer cache. Hash table values identify each of the one or more sharable data blocks in buffer cache with their own identifiable 'fingerprint'. Eventually, a comparison is made between the hashed physical data block address of the requested data block and entries in the hash table.

In some cases, the fingerprint of the requested data block will match the corresponding fingerprint associated with one of the sharable blocks in buffer cache. (314-Yes) Blocks are individually identified with fingerprints as they may be part of multiple separate files. For example, the sharable data block may have been previously loaded in buffer cache when some or all of the data blocks from another file were loaded into buffer cache. This is because the sharable data block in buffer cache may be shared as a result of one or more other files within a deduplicated filesystem.

If a sharable block in buffer cache matches, one implementation proceeds to discard the new, but temporary, buffer holding the data block since the sharable block will instead be used as a single-instance of the data block in buffer cache. (320) This important step effectively increases the size of buffer cache by avoiding block duplication. The result is the ability to cache more data blocks while using the same storage footprint for the buffer cache. In an alternate implementation, the data block is stored in predetermined temporary buffer cache and it is merely cleared from buffer cache and not discarded. This latter alternate approach may be more efficient than allocating and discarding buffer cache in each instance.

Next, one implementation associates a new buffer header with the sharable data block matching the data block fingerprint. (322) For example, the new buffer header contains metadata for the process or thread using the sharable data block in buffer cache. This metadata may include information such as an inode of the file using the sharable data block or other information used to implement aspects of the present invention.

Aspects of the present invention further indicate that an additional reference is being made to the sharable data block. (324) In one implementation, a counter associated with the sharable data block in buffer cache tracks references being made to this sharable data block. The sharable data block in buffer cache is also marked to be conditionally copied when an attempt to modify or write over it occurs. (326) For example, a process sharing a data block in buffer cache would receive its own copy of the shared data block prior to writing-over or modifying the data. This method of managing the buffer cache may be referred to as a "copy on write" arrangement.

The reference to the sharable data block in buffer cache is then made searchable according to an FRP and offset in file. (318) This operation ensures that the sharable block may also be searched relative to a file reference pointer (FRP) in the event the same file and block in buffer cache is later requested.

It is also possible that the requested data block is not in buffer cache. (314-No). When this occurs, the new buffer and data block is added to the buffer cache and also made searchable according to its data block fingerprint. (316). In this case, the new buffer and data block is also made searchable according to an FRP and offset and the reference count indicates a single reference. (318)

Figure 4:
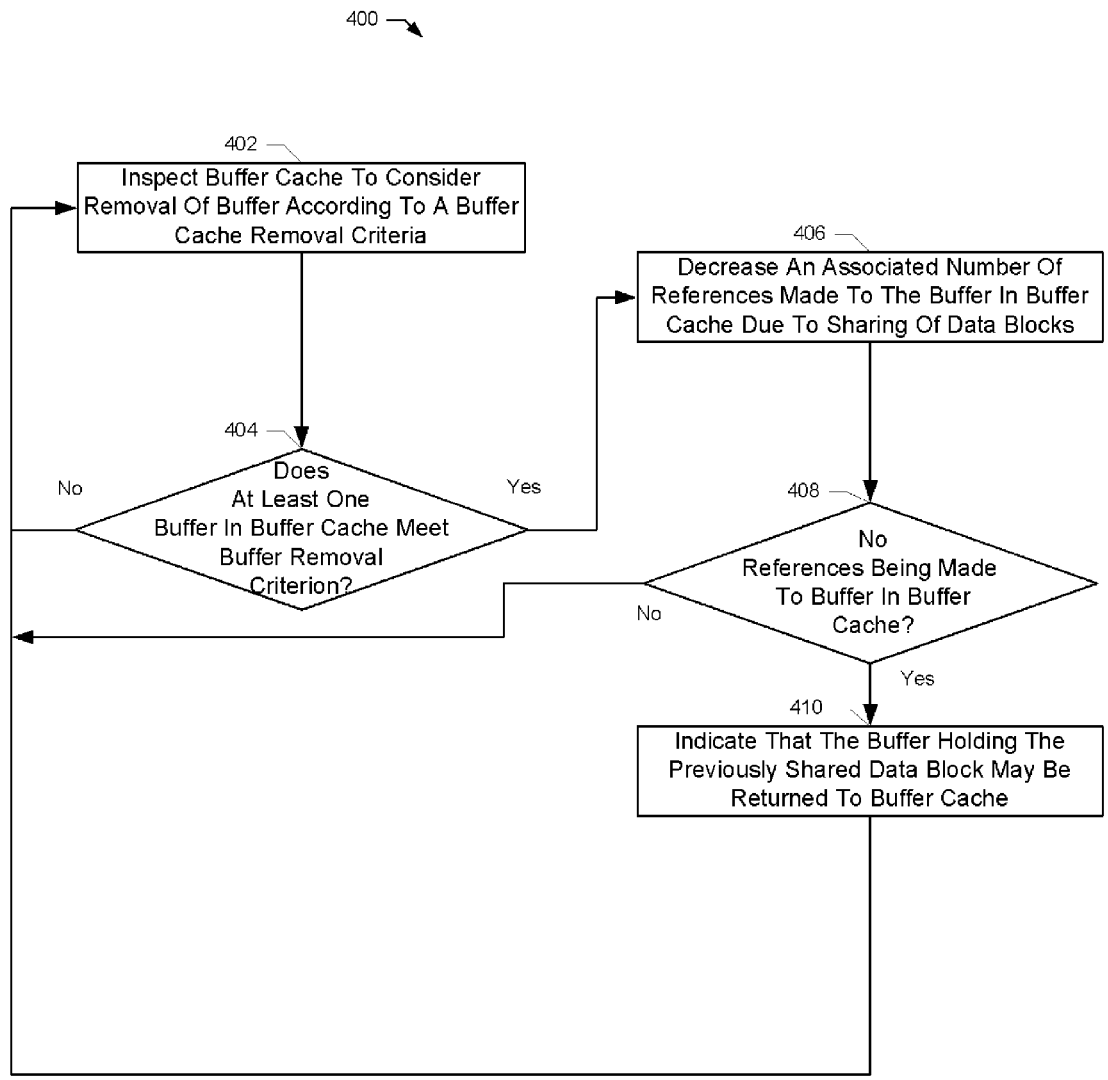
FIG. 4 is a flowchart diagram representation of the operations associated with removing a reference to a buffer in buffer cache in accordance with aspects of the present invention.

FIG. 4 is a flowchart diagram representation of the operations associated with removing a reference to a buffer in buffer cache in accordance with aspects of the present invention. In storage systems, entries in buffer cache may be removed upon demand, at predetermined time intervals, when the buffer cache resource is depleted or under other circumstances as deemed suitable by the buffer cache management. Implementations of the present invention inspect the buffer cache and consider removal according to a buffer cache removal criterion. (402) For example, one buffer cache removal method may remove the least recently used (LRU) buffers in order to keep buffers in the buffer cache available. The buffer cache manager of the present invention continues processing even if there are no buffers to be returned to the buffer cache pool. (404-No)

Alternatively, (404-Yes) returning a buffer to cache begins by first decreasing an associated number of references sharing the buffer in buffer cache. (406) Multiple references to a buffer in buffer cache may be removed if they meet the buffer removal criterion. In one implementation, a counter associated with a buffer in buffer cache is decremented when one less reference is made to the data block in buffer cache. Alternate methods may be implemented that keep track of the references using other mechanisms other than a counter. For example, a linked list of pointers may be used to implicitly indicate the number of references to the sharable data block.

If there are more references being made to the buffer in buffer cache then the buffer should not yet be marked for return back to the buffer cache. (408-No) For example, one reference to a shared data block may use the shared data block infrequently while another reference may use the shared data block more frequently and recently.

This process continues until eventually there are no references being made to a buffer in a buffer cache. (408-Yes) Once this occurs, aspects of the present invention indicate that the buffer holding the previously shared data block may be returned to buffer cache. (410) For example, the buffer returned to the buffer cache may be overwritten with a new data block when there are no more references to the data block. If the shared data block in buffer cache is 'dirty' then it may also be necessary for the block to first be written to disk before the buffer is made available again in buffer cache.

Figure 5:
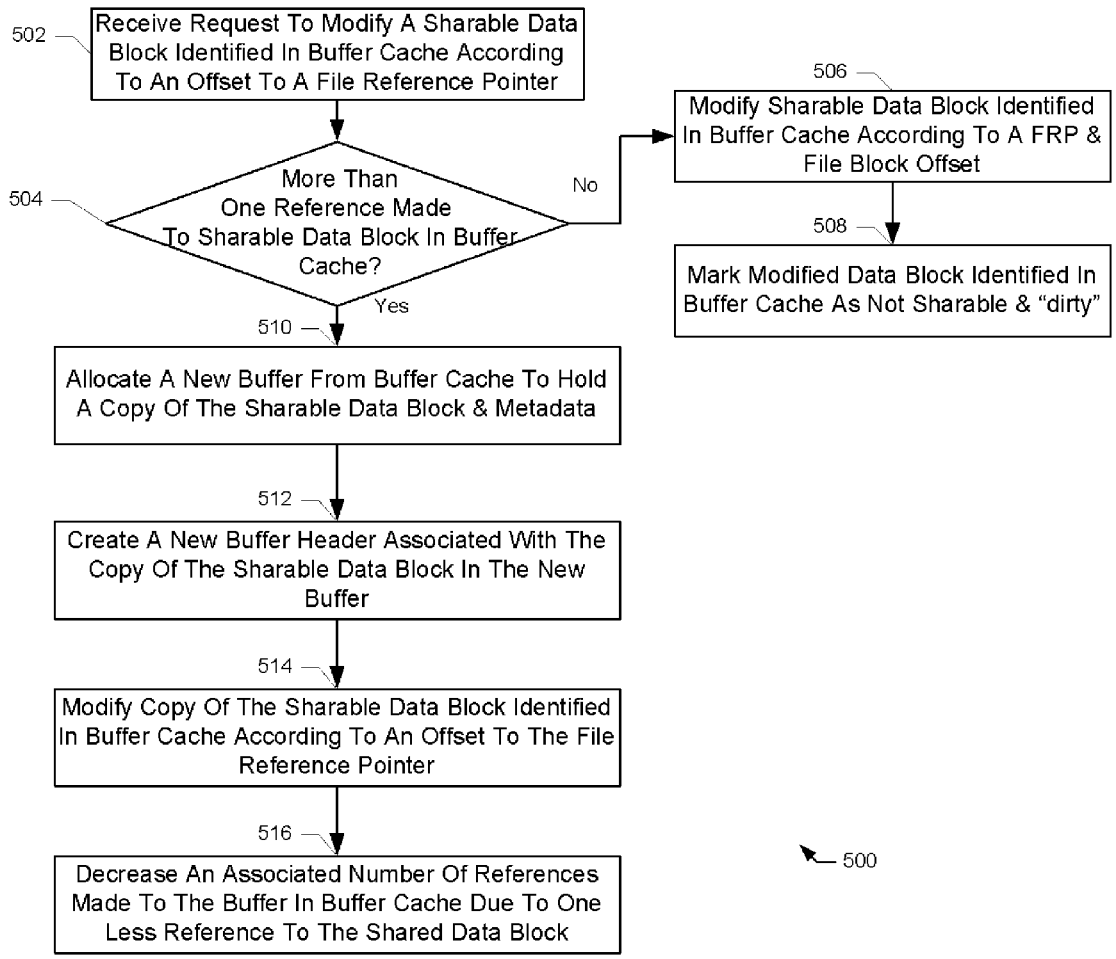
FIG. 5 is a flowchart diagram representation of the operations associated with modifying a sharable data block in buffer cache in accordance with aspects of the present invention.

FIG. 5 is a flowchart diagram representation of the operations associated with modifying a sharable data block in buffer cache in accordance with aspects of the present invention. Sharable data blocks in buffer cache are marked as "copy on write" if a process attempts to modify the contents in buffer cache. The "copy on write" setting ensures that other references to the shared data block in buffer cache will continue to work properly after the modification.

One implementation of the present invention receives a request to modify a sharable data block located in buffer cache according to an offset to a file reference pointer. (502) If there is only one reference made to the sharable data block (504-No) then it may not be necessary to copy the sharable data block before it is modified. If this is the case, the sharable data block in buffer cache is referenced according to a file block offset from the file reference pointer and modified as requested. (506) The buffer cache entry with the modified data block may then be identified as modified or 'dirty' and not sharable until it is written to disk. (508)

Alternatively, there may be multiple references to the sharable data block making a "copy on write" appropriate. (504-Yes) The "copy on write" in one implementation begins by allocating a new buffer from buffer cache to hold a copy of the sharable data block and metadata. (510) Next, one aspect of the present invention creates a new buffer header associated with the copy of the new buffer holding the sharable data block. (512) For example, this additional new reference may be made using the new buffer header containing a copy of the relevant metadata. Alternatively, it is also possible that a previously allocated buffer header is used instead of a new buffer header and the metadata is modified as necessary. In either case, it should be appreciated that the sharable data block in buffer cache is marked as "copy on write" and remains available for other processes to request and share.

Once a copy is made, modifications are made to the copy of the sharable data block identified in buffer cache identified by an offset to the file reference pointer. (514) The buffer cache management then decreases an associated number of references made to the buffer in buffer cache due to one less reference to the shared data block. (516)

Figure 6:
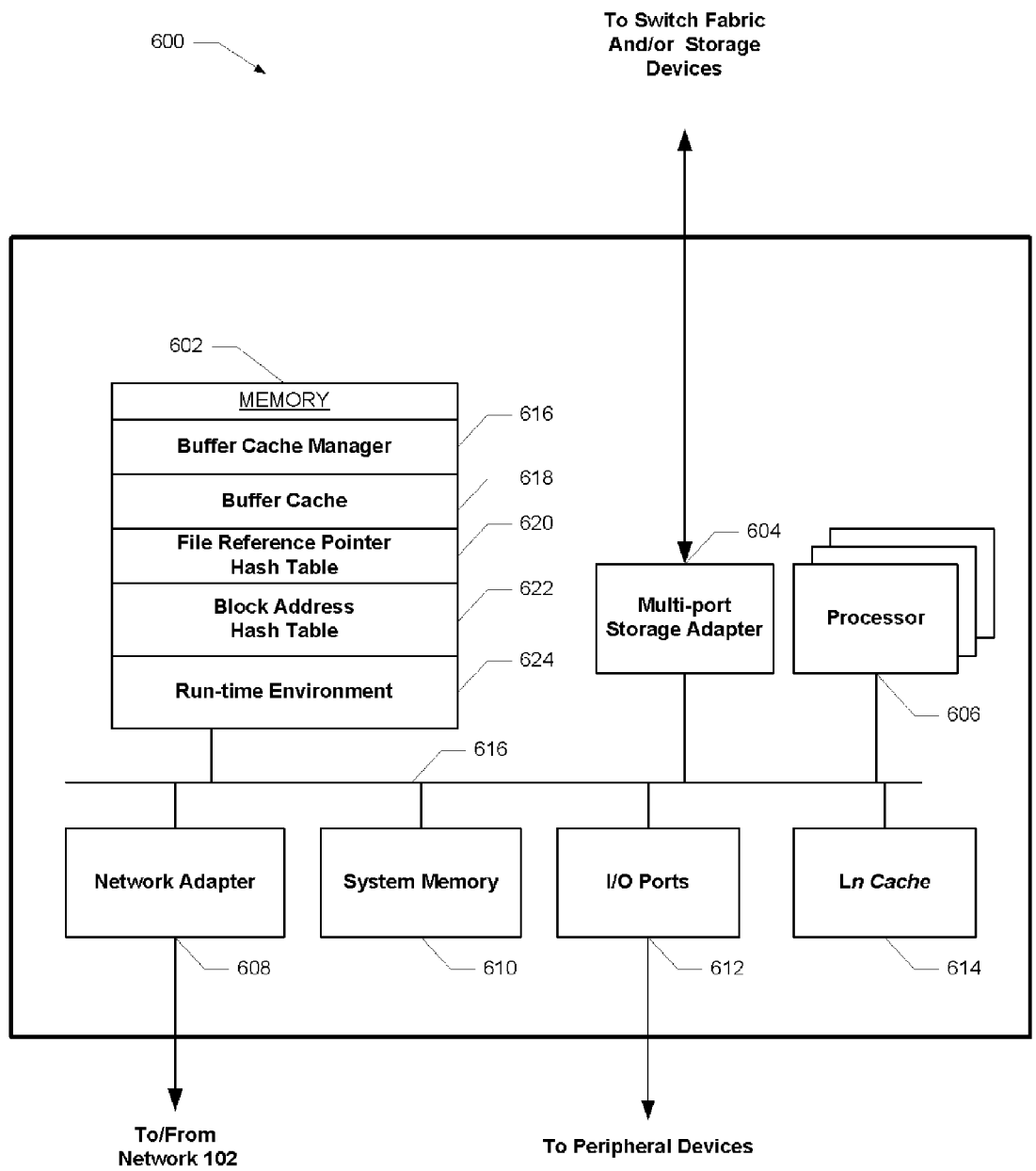
FIG. 6 is a schematic block diagram of storage server that may be advantageously used in conjunction with one implementation of the present invention.

FIG. 6 is a schematic block diagram of storage server 600 that may be advantageously used with one implementation of the present invention. Storage server 600 includes a memory 602, a multi-port storage adapter 604, a processor/core complex 606, a network adapter 608, Ln Cache 614, system memory 610 and I/O ports 612 capable of communicating over interconnect 616. It is contemplated that aspects of the invention described herein may apply to any type of special-purpose computer (e.g., file serving appliance) or general-purpose computer, including a standalone computer, embodied as a storage system. To that end, storage server 600 may be broadly, and alternatively, referred to as a component of the storage system 100 in FIG. 1. Moreover, various aspects of the invention can be adapted to a variety of storage system architectures including, but not limited to, a network-attached storage (NAS) environment, a storage area network (SAN) and disk assembly directly-attached to a client or host computer. The term "storage system" should, therefore, be taken broadly to include such arrangements and combinations thereof.

In the illustrative implementation in FIG. 6, memory 602 includes storage locations that are addressable by the processor and adapters for storing software program code and data. For example, memory 602 may include a form of random access memory (RAM) that is generally cleared by a power cycle or other reboot operation and classified as "volatile" memory. Processor complex 606 and various adapters may, in turn, comprise processing elements and/or logic circuitry configured to execute the software code and manipulate the data stored in the memory 602. Ln Cache 614 includes L1, L2 and other levels of cache available in a computer. While examples of the present invention may be illustrated using memory or system memory however it is also contemplated that aspects of the present invention may also use different types of cache in a computer including cache such as L1, L2 or even L3 cache if at all available. It is also contemplated that aspects of the present invention may be implemented using virtual memory that may access and use disk storage in combination with memory and higher speed cache.

Memory 602 may include storage operating systems portions of which are typically resident in memory and executed by the processing elements. Storage operating systems functionally organize storage server 600 by, inter alia, invoking storage operations in support of a storage service implemented by storage server 600. As previously described, the term "storage operating system" as used herein with respect to a storage server generally refers to the computer-executable code operable on a storage system that implements file system semantics (such as the above-referenced WAFL™) and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

It is contemplated that storage operating system may execute within a run-time environment 624 that may include a general purpose operating system or virtualization environments that help improve utilization and efficient allocation of hardware and computing resources on storage server 600. It will be apparent to those skilled in the art that other processing and memory areas, including various computer readable media, may be used for storing and executing program instructions pertaining to the inventive techniques described herein.

Buffer cache manager 616 includes functions and datasets necessary for implementing aspects of the present invention. Among these functions, buffer cache manager is capable of making a single instance buffer cache with reduced or no duplication of blocks in buffer cache. Single instance buffer cache 618 may contain one or more sharable data blocks and no duplicate data blocks. As a result, a single sharable data block may be referenced by one or multiple processes or threads thereby increasing the effective capacity of buffer cache in accordance with the present invention.

File reference pointer hash table 620 helps identify data blocks in buffers according to an offset relative to a file reference pointer (FRP). Block address hash table 622 is a second hash table that identifies a data block according to a 'fingerprint' of the data block itself. These 'fingerprints' allow data blocks shared in storage to be readily be identified and shared in buffer cache. These fingerprints may be a hash of a physical data block address, a checksum on the contents of the data block or other techniques for identifying a specific data block in a storage system.

Multi-port storage adapter 604 cooperates with the storage operating system and run-time environment 624 executing on storage server 600 to access information requested by the one or more clients. Resulting information may be stored on or retrieved from the storage devices that are attached to the storage server 600 or other nodes of a storage system via the multi-port storage adapter 604. The multi-port storage adapter 604 includes input/output (I/O) interface circuitry that couples to the storage devices over an I/O interconnect arrangement, such as a conventional high-performance, Fibre Channel serial link topology. One or more interconnects on the multi-port storage adapter 604 may be used to provide higher throughput and/or reliability. The information is retrieved by the multi-port storage adapter 604 and, if necessary, processed by the processor/core complex 606 (or the multi-port storage adapter 604 itself) prior to being forwarded over interconnect 614 to the network adapter 608, where the information is formatted into one or more packets and returned to a requesting client.

In one implementation, the storage devices are arranged into a plurality of volumes, each having a file system associated therewith. These storage devices may include conventional magnetic tapes or disks, optical disks such as CD-ROM, DVD, magneto-optical (MO) storage or any other type of non-volatile storage devices suitable for storing large quantities of data.

Each volume may include one or more disks. Implementations of the present invention can configure the physical disks of storage devices into RAID groups so that some disks store striped data and at least one disk stores separate parity for the data, in accordance with a RAID 4 configuration. However, other configurations (e.g. RAID 5 having distributed parity across stripes, RAID 0 mirroring and others) are also contemplated. In a typical implementation, a volume is implemented as a multiplicity of RAID groups.

Processor complex 606 represents the one or more computational units available in storage server 600 that contribute to an MP environment. It is contemplated that processor complex 600 may be a physical aggregation of multiple individual processors that each individually process and transfer data over interconnect 614. Alternate implementations of processor/core complex 606 may be a single processor having multiple on-chip cores that may partition and share certain resources also on the single processor chip such as L1/L2 cache. This latter implementation may use this single processor to coordinate the respective communications directly through interconnect 614. Processors with a single core are also contemplated in addition to those mentioned above.

For at least these reasons, aspects of the present invention may be described as using a processor or multiple processors for convenience however it is also contemplated that similar implementations could be applied to designs utilizing one core or multiple cores found on a single processor element. Indeed, the term multi-processor or MP should also include multi-core solutions as well. Likewise, the term process is also used for convenience and clarity to describe the act of executing instructions on one or several processors but it is also contemplated that alternate implementations could be performed using a thread or multiple threads executing the same or similar instructions.

The network adapter 608 comprises the mechanical, electrical and signaling circuitry needed to connect the storage server 600 to clients over network 614, which may include a point-to-point connection or a shared medium, such as a LAN.

The system memory 610 may be used to provide fault-tolerant backup of data, enabling the integrity of storage server transactions to survive a service interruption based upon a power failure, or other fault. The size of the system memory 610 is variable, although it is typically sized sufficiently to log a certain time-based chunk of transactions (for example, several seconds worth). In one implementation, system memory 610 is NVRAM and may store client requests corresponding to discrete client messages requesting file transactions such as "WRITE," "CREATE," "OPEN," and the like. Further, these entries may be logged in the NVRAM, e.g., according to the particular order they are completed. The use of the NVRAM for system backup and crash recovery operations is generally described in commonly assigned application Ser. No. 09/898,894, entitled "System and Method for Parallelized Replay of an NVRAM Log in a Storage Appliance" by Steven S. Watanabe et al. assigned to the assignee of the present invention and expressly incorporated herein by reference.

I/O ports 612 may be connected to a variety of display devices, keyboards, mouse and other devices to interact with storage server 600 and the processes being run thereupon. A CD-ROM, DVD or other non-volatile storage device along with a respective CD-ROM, DVD or other storage media can also be connected via I/O ports 212 to storage server 600. These storage media may contain one or more implementations of the present invention tangibly embodied on the storage media with instructions capable of being executed on the processor complex 606.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of reducing data duplication in a buffer cache comprising:

accessing, by a storage management computing device, a file reference pointer associated with a file in a deduplicated file system when loading a requested data block from the file into the buffer cache;

comparing, by the storage management computing device, when the requested data block is not stored in association with the file reference pointer in the buffer cache, a fingerprint from the requested data block that identifies the requested data block taken from the deduplicated filesystem against one or more fingerprints identifying a corresponding one or more shareable data blocks in the buffer cache;

determining, by the storage management computing device, when there is at least one other file reference pointer associated with a shareable data block of the one or more shareable data blocks in the buffer cache, and based on the comparing, when there is a match between the fingerprint of the requested data block and a fingerprint of the shareable data block of the one or more shareable data blocks in the buffer cache;

marking, by the storage management computing device, the shareable data block from the match in the buffer cache when there is an attempt to modify the shareable data block, wherein the marked shareable data block is copied to the buffer cache after the attempt to modify the shareable data block and when there is at least one other file reference pointer associated with the shareable data block; and allocating, by the storage management computing device, the shareable data block from the match in the buffer cache, wherein the allocating comprises associating a new buffer header with the shareable data block, the new buffer header comprising metadata for the shareable data block.

2. The method of claim 1 further comprising:

allocating, by the storage management computing device, a new buffer from the buffer cache to hold the requested data block accessed through the file reference pointer of the deduplicated filesystem;

discarding, by the storage management computing device, the new buffer used to hold the requested data block from the file in the deduplicated filesystem based on the determination that there is a match between the fingerprint of the requested data block and the fingerprint of the shareable data block.

3. The method of claim 1 further comprising:

determining, by the storage management computing device, when a first offset and the file reference pointer associated with the requested data block taken from the file in the deduplicated filesystem matches a comparison offset and a comparison file reference pointer associated with a particular shareable data block of the one or more shareable data blocks in buffer cache; and allocating, by the storage management computing device, the particular shareable data block from the buffer cache having the comparison offset and the comparison file reference pointer that matches the first offset and the file reference pointer corresponding to the requested data block from the file in the deduplicated filesystem.

4. The method of claim 3 wherein each file reference pointer is associated with a file in the deduplicated file system and each different offset from each file reference pointer corresponds to a different data block in the file.

5. The method of claim 3 further comprising:
making, by the storage management computing device, the one or more shareable data blocks in buffer cache searchable according to a hash function that uses both the comparison file reference pointer and the comparison offset from the comparison file reference pointer for each of the one or more shareable data blocks.

6. The method of claim 1, wherein at least one of the shareable data blocks in buffer cache represents one or more data blocks shared by one or more files in the deduplicated filesystem.

7. The method of claim 1 wherein the allocating further comprises:
associating, by the storage management computing device, a new buffer header with the shareable data block that matches the fingerprint of the requested data block; and
including, by the storage management computing device, metadata from the deduplicated filesystem in the new buffer header responsive to the request for the requested data block.

8. The method of claim 1 further comprising:
updating, by the storage management computing device, a share count stored in association with the shareable data block to indicate that the shareable data block is a shared data block based on the determination that there is a match between the fingerprint of the requested data block and the fingerprint of the shareable data block, wherein the share count indicates a number of references being made to the shareable data block in the buffer cache.

9. The method of claim 1 wherein a particular fingerprint for a particular data block associated with at least one of a particular requested data block and a particular shared data block are generated by:
obtaining, by the storage management computing device, a physical data block address associated with the particular data block as it is stored in the deduplicated filesystem; and
performing, by the storage management computing device, a hash operation on the physical data block address associated with the particular data block that identifies the particular data block.

10. The method of claim 9 further comprising a volume identifier associated with each physical data block address in the hash operation to accommodate for duplicate physical data block addresses in a filesystem capable of having two or more volumes.

11. A storage management computing device comprising:
a processor;
a memory coupled to the processor which is configured to be capable of executing programmed instructions comprising and stored in the memory to:
access a file reference pointer associated with a file in a deduplicated filesystem when loading a requested data block from the file into the buffer cache;
compare, when the requested data block is not stored in association with the file reference pointer in the buffer cache, a fingerprint from the requested data block that identifies the requested data block taken from the deduplicated filesystem against one or more fingerprints identifying a corresponding one or more shareable data blocks in the buffer cache;
determine when there is at least one other file reference pointer associated with a shareable data block of the one or more shareable data blocks in the buffer cache, and based on the comparing, when there is a match between the fingerprint of the requested data block and a fingerprint of the shareable data block of the one or more shareable data blocks in the buffer cache;
mark the shareable data block from the match in the buffer cache when there is an attempt to modify the shareable data block wherein the marked shareable data block is copied to the buffer cache after the attempt to modify the shareable data block and when there is at least one other file reference pointer associated with the shareable data block; and
allocate the shareable data block from the match in the buffer cache, wherein the allocating comprises associating a new buffer header with the shareable data block, the new buffer header comprising metadata for the shareable data block.

12. The device of claim 11 wherein the processor is further configured to be capable of executing programmed instructions comprising and stored in the memory to:
allocates a new buffer from the buffer cache to hold the requested data block accessed through the file reference pointer of the deduplicated filesystem; and
discards the new buffer used to hold the requested data block from the file in the deduplicated filesystem based on the determination that there is a match between the fingerprint of the requested data block and the fingerprint of the shareable data block.

13. The device of claim 11 wherein the processor is further configured to be capable of executing programmed instructions comprising and stored in the memory to:
determines when a first offset and the file reference pointer associated with the requested data block taken from the file in the deduplicated filesystem matches a comparison offset and a comparison file reference pointer associated with a particular shareable data block of the one or more shareable data blocks in buffer cache, and
allocates the particular shareable data block from the buffer cache having the comparison offset and the comparison file reference pointer that matches the first offset and the file reference pointer corresponding to the requested data block from the file in the deduplicated filesystem.

14. The device of claim 13 wherein each file reference pointer is associated with a file in the deduplicated filesystem and each different offset from each file reference pointer corresponds to a different data block in the file.

15. The device of claim 11 wherein the processor is further configured to be capable of executing programmed instructions comprising and stored in the memory to:
makes the one or more shareable data blocks in buffer cache searchable according to a hash function that uses both the comparison file reference pointer and the comparison offset from the comparison file reference pointer for each of the one or more shareable data blocks.

16. The device of claim 11 wherein at least one of the shareable data blocks in buffer cache represents one or more data blocks shared by one or more files in the deduplicated filesystem.

17. The device of claim 11 wherein the processor is further configured to be capable of executing programmed instructions comprising and stored in the memory to:
associates a new buffer header with the shareable data block that matches the fingerprint of the requested data block; and
includes metadata from the deduplicated filesystem in the new buffer header responsive to the request for the requested data block.

18. The device of claim 11 further comprising instructions that, when executed on the processor, cause the processor to update a share count stored in association with the shareable data block to indicate that the shareable data block is a shared data block in response to the determination that the compare results in the match between the fingerprint of the requested data block and the fingerprint of the shareable data block, wherein the share count indicates a number of references being made to the shareable data block in the buffer cache.

19. The of device claim 11 wherein a particular fingerprint for a particular data block associated with at least one of the requested data block and a particular shareable shared-data block is generated with instructions that,
   obtain a physical data block address associated with the particular data block as it is stored in the deduplicated filesystem, and
   perform a hash operation on the physical data block address associated with the particular data block that identifies the particular data block.

20. The device of claim 19 further comprising instructions that include a volume identifier associated with each physical data block address in the hash operation to accommodate for duplicate physical data block addresses in a filesystem capable of having two or more volumes.

21. The method of claim 1 wherein the fingerprint from the requested data block that identifies the requested data block and the one or more fingerprints identifying the corresponding one or more shareable data blocks in the buffer cache comprise fingerprints of storage address information for the respective data blocks are stored in the storage device.

22. The method of claim 21 wherein the storage address information comprises a physical data block address of the respective data block, a virtual volume block number of the respective data block, or a physical volume block number of the respective data block.

23. The device of claim 11 wherein the fingerprint from the requested data block that identifies the requested data block and the one or more fingerprints identifying the corresponding one or more shareable data blocks in the buffer cache comprise fingerprints of storage address information for the respective data blocks are stored in the storage device.

24. The device of claim 23 wherein the storage address information comprises a physical data block address of the respective data block, a virtual volume block number of the respective data block, or a physical volume block number of the respective data block.

25. A non-transitory computer readable medium having stored thereon instructions for reducing data duplication in a buffer cache used in conjunction with a storage device comprising machine executable code which when executed by at least one processor, causes the processor to perform steps comprising:
   accessing a file reference pointer associated with a file in a deduplicated file system when loading a requested data block from the file into the buffer cache;
   comparing, when the requested data block is not stored in association with the file reference pointer in the buffer cache, a fingerprint from the requested data block that identifies the requested data block taken from the deduplicated filesystem against one or more fingerprints identifying a corresponding one or more shareable data blocks in the buffer cache;
   determining when there is at least one other file reference pointer associated with a shareable data block of the one or more shareable data blocks in the buffer cache, and based on the comparing, when there is a match between the fingerprint of the requested data block and a fingerprint of the shareable data block of the one or more shareable data blocks in the buffer cache;
   marking the shareable data block from the match in the buffer cache when there is an attempt to modify the shareable data block, wherein the marked shareable data block is copied to the buffer cache after the attempt to modify the shareable data block and when there is at least one other file reference pointer associated with the shareable data block;
   allocating the shareable data block from the match in the buffer cache, wherein the allocating comprises associating a new buffer header with the shareable data block, the new buffer header comprising metadata for the shareable data block.

26. The medium of claim 25 further having stored thereon instructions that when executed by the processor cause the processor to perform steps further comprising:
   allocating a new buffer from the buffer cache to hold the requested data block accessed through the file reference pointer of the deduplicated filesystem;
   discarding the new buffer used to hold the requested data block from the file in the deduplicated filesystem based on the determination that there is a match between the fingerprint of the requested data block and the fingerprint of the shareable data block.

27. The medium of claim 25 further having stored thereon instructions that when executed by the processor cause the processor to perform steps further comprising:
   determining when a first offset and the file reference pointer associated with the requested data block taken from the file in the deduplicated filesystem matches a comparison offset and a comparison file reference pointer associated with a particular shareable data block of the one or more shareable data blocks in buffer cache; and
   allocating the particular shareable data block from the buffer cache having the comparison offset and the comparison file reference pointer that matches the first offset and the file reference pointer corresponding to the requested data block from the file in the deduplicated filesystem.

28. The medium of claim 27 wherein each file reference pointer is associated with a file in the deduplicated file system and each different offset from each file reference pointer corresponds to a different data block in the file.

29. The medium of claim 25 further having stored thereon instructions that when executed by the processor cause the processor to perform steps further comprising:
   making the one or more shareable data blocks in buffer cache searchable according to a hash function that uses both the comparison file reference pointer and the comparison offset from the comparison file reference pointer for each of the one or more shareable data blocks.

30. The medium of claim 25, wherein at least one of the shareable data blocks in buffer cache represents one or more data blocks shared by one or more files in the deduplicated filesystem.

31. The medium of claim 25 wherein the allocating further comprises:
   associating a new buffer header with the shareable data block that matches the fingerprint of the requested data block; and
   including metadata from the deduplicated filesystem in the new buffer header responsive to the request for the requested data block.

32. The medium of claim 25, further having stored thereon instructions that when executed by the processor cause the processor to perform steps further comprising:
   updating a share count stored in association with the shareable data block to indicate that the shareable data block is a shared data block based on the determination that there is a match between the fingerprint of the requested data block and the fingerprint of the shareable data block, wherein the share count indicates a number of references being made to the shareable data block in the buffer cache.

33. The medium of claim 25 wherein a particular fingerprint for a particular data block associated with at least one of a particular requested data block and a particular shared data block is generated by:
   obtaining a physical data block address associated with the particular data block as it is stored in the deduplicated filesystem; and
   performing a hash operation on the physical data block address associated with the particular data block that identifies the particular data block.

34. The medium of claim 33 further having stored thereon instructions that when executed by the processor cause the processor to perform steps further comprising:
   associating a volume identifier with each physical data block address in the hash operation to accommodate for duplicate physical data block addresses in a filesystem capable of having two or more volumes.

35. The medium of claim 25 wherein the fingerprint from the requested data block that identifies the requested data block and the one or more fingerprints identifying the corresponding one or more shareable data blocks in the buffer cache comprise fingerprints of storage address information for the respective data blocks are stored in the storage device.

36. The medium of claim 35 wherein the storage address information comprises a physical data block address of the respective data block, a virtual volume block number of the respective data block, or a physical volume block number of the respective data block.

* * * * *